United States Patent [19]
Sugiyama et al.

[11] Patent Number: 5,815,631
[45] Date of Patent: Sep. 29, 1998

[54] APPARATUS AND METHOD FOR CONTROLLING AN AUDIO VIDEO SYSTEMS

[75] Inventors: Koichi Sugiyama, Kanagawa; Noboru Motoyoshi, Tokyo; Hisato Shima, Kanagawa; Noriko Kotabe, Chiba; Makoto Sato; Junichi Tsukamoto, both of Tokyo, all of Japan

[73] Assignee: Sony Corporation, Tokyo, Japan

[21] Appl. No.: 505,954

[22] Filed: Jul. 24, 1995

[30] Foreign Application Priority Data

Aug. 3, 1994 [JP] Japan ................................ 6-201297

[51] Int. Cl.⁶ ..................................................... H04N 5/76
[52] U.S. Cl. ................................................ 386/46; 386/52
[58] Field of Search .................................... 386/46, 83, 8, 386/52, 106, 105; 348/730, 705, 729; 360/61, 62; 369/84, 69; 364/551.1; H04N 5/76

[56] References Cited

U.S. PATENT DOCUMENTS

| | | | |
|---|---|---|---|
| 3,843,929 | 10/1974 | Mayle | 348/730 |
| 4,413,290 | 11/1983 | Furuta | 369/69 |
| 4,523,239 | 6/1985 | Iwasawa | 360/74.1 |
| 4,717,968 | 1/1988 | Painton et al. | 386/8 |
| 4,808,992 | 2/1989 | Beyers, Jr. et al. | 386/96 |
| 5,170,159 | 12/1992 | Kawabata et al. | 348/730 |
| 5,262,903 | 11/1993 | Kim | 360/33.1 |
| 5,301,181 | 4/1994 | Shiba et al. | 369/84 |
| 5,631,850 | 5/1997 | Tanaka et al. | 364/551.1 |

FOREIGN PATENT DOCUMENTS

| | | |
|---|---|---|
| 0 371 749 A | 6/1990 | European Pat. Off. . |
| 2 641 660 A | 7/1990 | France . |

*Primary Examiner*—Thai Tran
*Assistant Examiner*—Huy Nguyen
*Attorney, Agent, or Firm*—Frommer Lawrence & Haug LLP; William S. Frommer; Dennis M. Smid

[57] ABSTRACT

A method and apparatus for controlling an audio video (AV) system having a number of AV devices so as to cause power to be turned off to the AV devices upon the occurrence of predetermined events. That is, power for the AV devices may be turned off: (i) when a video signal is no longer being transmitted between selected AV devices, (ii) when a recording medium of one of a recording AV device and a reproducing AV device that perform a dubbing operation is at its end position, and (iii) when a predetermined time has elapsed.

10 Claims, 6 Drawing Sheets

APPARATUS AND METHOD FOR CONTROLLING AN AUDIO VIDEO SYSTEMS

BACKGROUND OF THE INVENTION

The present invention relates to a technique for controlling an audio video (AV) system having a plurality of audio video devices.

An AV system may be formed by combining a plurality of AV devices such as a TV receiver, a video tape recorder/reproducer (VTR), a video disc player, and a satellite broadcasting tuner. Such AV system may permit data to be edited and dubbed between AV devices. Further, a received image of a satellite broadcasting program may be displayed on the TV receiver and recorded on the VTR. In addition, other various processes may be performed by such AV system.

When a number of AV devices are used in combination, the operations thereof may become very complicated. As an example, consider the situation in which a satellite broadcasting program is desired to be received by a satellite broadcasting tuner of an AV system and recorded in a VTR thereof. In such situation, the satellite broadcasting tuner and the VTR should be turned on, a desired program channel should be selected and received by the satellite broadcasting tuner, the VTR should be placed in a record mode, the record operation of the VTR should be stopped after the desired program has been recorded, and the power for the satellite broadcasting tuner and the VTR should be turned off.

As another example, consider the situation in which a dubbing operation is to be performed in an AV system having at least two VTRs. In such situation, one VTR should be placed in a reproduction mode and another VTR should be placed in a record mode, the reproducing/recording or dubbing operation is performed, and the power for the reproducing VTR and the recording VTR should be turned off after the dubbing operation is completed.

As another example, consider the situation in which a satellite broadcasting program is to be received by a satellite broadcasting tuner and recorded in a VTR, and thereafter the recording is to be stopped at predetermined time. In such a situation, timers of the satellite broadcasting tuner and the VTR should be set. However, depending on the AV device, a timer may not be available.

As is to be appreciated, in these examples, it would be desirable to have the power of the AV devices automatically terminated either upon completion of the selected operation or after a predetermined occurrence.

OBJECTS AND SUMMARY OF THE INVENTION

An object of the present invention is to provide a technique for controlling an AV system which terminates power to the AV devices of the AV system when an image signal is not being transmitted between a number of the AV devices such that the image signal is not present on or is absent from a signal path formed between such AV devices.

Another object of the present invention is to provide a technique for controlling an AV system having a recording AV device and a reproducing AV device adaptable for performing a dubbing operation which terminates power to the AV devices of the AV system when a recording medium of either of the recording AV device and the reproducing AV device performing a dubbing operation is at its end position.

A further object of the present invention is to provide a technique for controlling an AV system having a number of AV devices which terminates power to the AV devices when or after a selected set time has elapsed.

In accordance with an aspect of the present invention, a technique is provided for controlling an audio video system including a plurality of audio video devices each having a controller coupled through a control bus to each respective controller of at least another one of the audio video devices. At least one of the audio video devices transmits audio and video signals to at least one of the other audio video devices. The technique includes detecting whether a video signal is present on a signal path between the audio video devices, and turning off power to each of the audio video devices when the video signal is absent from the signal path.

In accordance with another aspect of the present invention, a technique is provided for controlling an audio video system including a plurality of audio video devices each having a controller coupled through a control bus to each respective controller of at least another one of the audio video devices. One of the audio video devices is designated a reproducing audio video device and another of the audio video devices is designated a recording audio video device. Data is dubbed from the reproducing audio video device to the recording audio video device. The technique includes determining whether or not a recording medium of one of the reproducing audio video device and the recording audio video device is at an end position, and turning off power to each of the audio video devices when the recording medium of one of the reproducing audio video device and the recording audio video device is at its respective end position.

In accordance with a still further aspect of the present invention, a technique is provided for controlling an audio video system including a plurality of audio video devices each having a controller coupled through a control bus to each respective controller of at least another one of the audio video devices. The technique includes determining whether or not a predetermined set time has elapsed, and turning off power to each of the audio video devices when the predetermined set time has elapsed.

Other objects, features and advantages according to the present invention will become apparent from the following detailed description of illustrated embodiments when read in conjunction with the accompanying drawings in which corresponding components are identified by the same reference numerals.

DESCRIPTION OF THE PREFERRED EMBODIMENTS

Preferred embodiments of the present invention will now be described with reference to the accompanying drawings.

Figure 1:
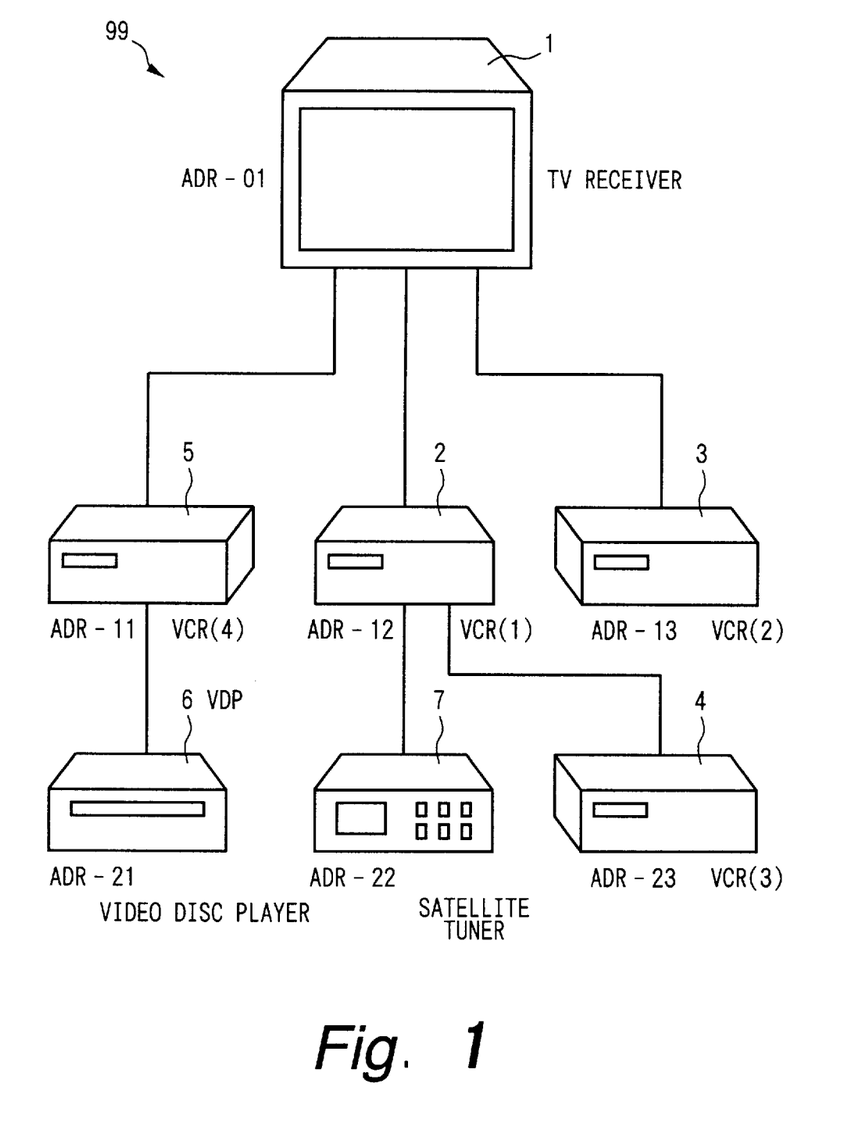
FIG. 1 is a perspective view of an AV system according to the present invention.
Figure 2:
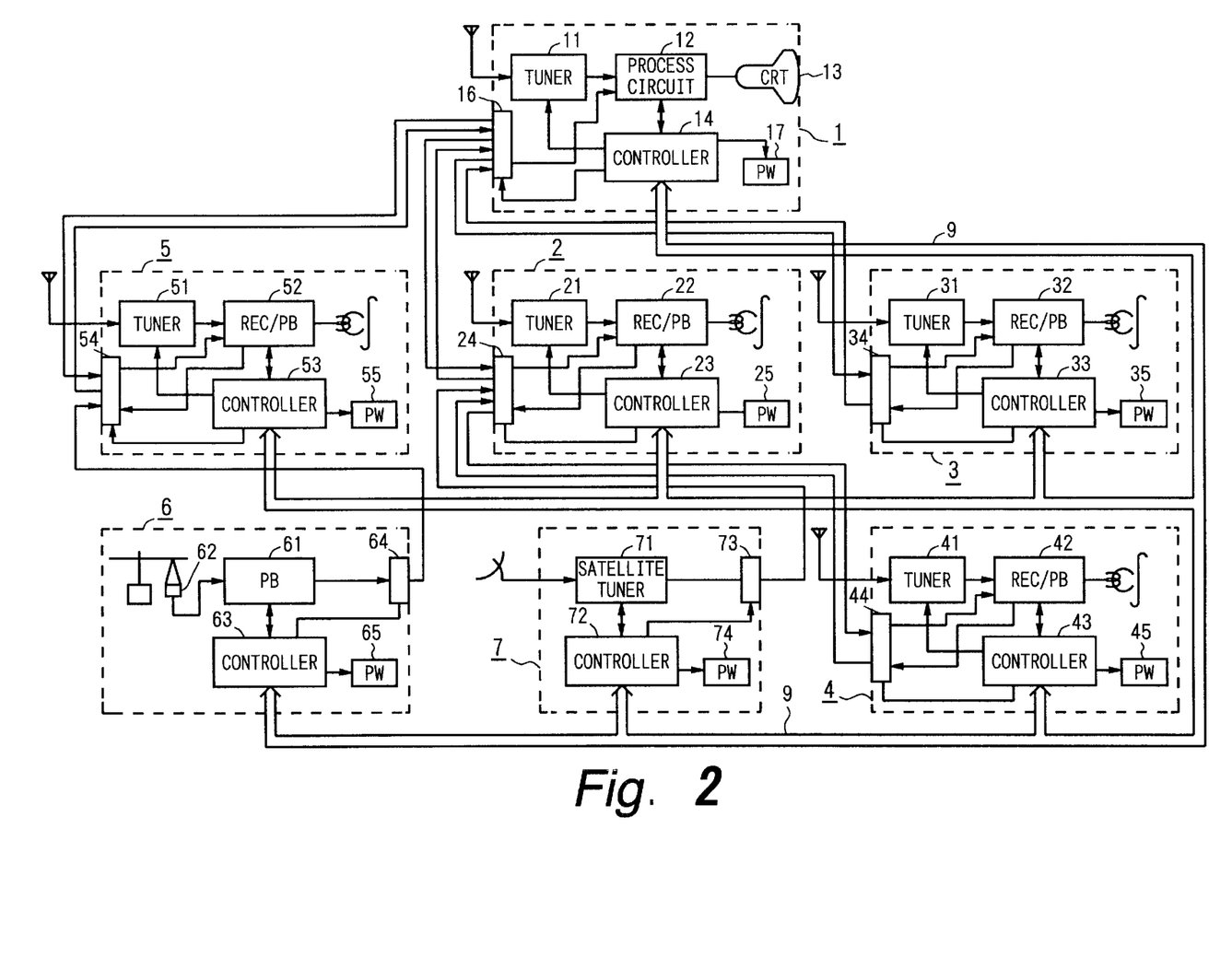
FIG. 2 is a diagram of the AV system of FIG. 1.

FIG. 1 illustrates an audio video (AV) system 99. As shown therein, such AV system 99 includes a TV receiver 1, four VTRs 2–5, a video disc player (VDP) 6, and a satellite broadcasting tuner 7. FIG. 2 illustrates the AV system in more detail.

More specifically, the TV receiver 1 includes a tuner circuit 11, an audio and video signal process circuit 12, a cathode ray tube (CRT) display 13, a controller 14, an input and output selector 16, and a power supply circuit 17 which are coupled as shown in FIG. 2. The TV receiver 1 is adapted to receive a signal from an antenna and to supply the received signal through the tuner 11 to the signal process circuit 12, whereupon the signal is processed and a video portion thereof is supplied to the CRT 13 so as to be displayed thereat and an audio portion thereof is supplied to a speaker (not shown). The TV receiver 1 is further adapted to receive an input signal from and to output a signal to other devices of the AV system by way of the input and output selector 16. The controller 14 controls the operation of the TV receiver 1, including operations of the tuner circuit 11, the signal process circuit 12, the input and output selector 16 and the power supply circuit 17. The power supply circuit 17 supplies power to the TV receiver 1.

The first VTR 2 includes a tuner circuit 21, a recording and reproducing circuit 22, a controller 23, an input and output selector 24, and a power supply circuit 25 which are coupled as shown in FIG. 2. The VTR 2 is adapted to receive a signal, such as from an antenna, and to supply the received signal through the tuner 21 to the recording and reproducing circuit 22, whereupon the signal is processed and recorded on a recording medium, such as magnetic tape. The recording and reproducing circuit 22 may reproduce a previously recorded signal from a recording medium. The VTR 2 is further adapted to receive an input signal from and to supply an output signal to other devices of the AV system by way of the input and output selector 24. The controller 23 controls the operations of the VTR, including operations of the tuner circuit 21, the recording and reproducing circuit 22, the input and output selector 24 and the power supply circuit 25. The power supply circuit 25 supplies power to the VTR 2.

The second VTR 3 includes a tuner circuit 31, a recording and reproducing circuit 32, a controller 33, an input and output selector 34, and a power supply circuit 35 which are coupled as shown in FIG. 2 and which function in a manner similar to the corresponding components of the VTR 2. That is, the recording and reproducing circuit 32 may process a received signal for recording onto a recording medium and may reproduce a previously recorded signal therefrom. Further, a signal may be received from and supplied to other devices by way of the input and output selector 33, and the controller 33 controls the operations of the second VTR 3 including operations of the tuner circuit 31, the recording and reproducing circuit 32, the selector 34 and the power supply circuit 35. The power supply circuit 35 supplies power to the second VTR 3.

The third VTR 4 includes a tuner circuit 41, a recording and reproducing circuit 42, a controller 43, an input and output selector 44, and a power supply circuit 45 which are coupled as shown in FIG. 2 and which function in a manner similar to the corresponding components of the VTRs 2 and 3. That is, the recording and reproducing circuit 42 may process a received signal for recording and may reproduce a recorded signal, a signal may be received from and supplied to other devices by way of the input and output selector 44, and the controller 43 controls the operation of the third VTR 4 including operations of the tuner circuit 41, the recording and reproducing circuit 42, the selector 44 and the power supply circuit 45. The power supply circuit 45 supplies power to the third VTR 4.

The fourth VTR 5 includes a tuner circuit 51, a recording and reproducing circuit 52, a controller 53, an input and output selector 54, and a power supply circuit 55 which are coupled as shown in FIG. 2 and which function in a manner similar to the corresponding components of the VTRs 2, 3 and 4. That is, the recording and reproducing circuit 52 may process a received signal for recording and may reproduce a recorded signal, a signal may be received from and supplied to other devices by way of the input and output selector 54, and the controller 53 controls the operation of the fourth VTR 5 including operations of the tuner circuit 51, the recording and reproducing circuit 52, the controller 53, the selector 54 and the power supply circuit 55. The power supply circuit 55 supplies power to the fourth VTR 5.

The video disc player 6 includes a reproducing circuit 61, a pickup 62, a controller 63, an output selector 64, and a power supply circuit 65 which as coupled as shown in FIG. 2. A signal is reproduced from a video disc by the pickup 62 and supplied to the reproducing circuit 61, whereupon such signal is demodulated. The reproduced demodulated signal is supplied to other devices in the AV system, such as the fourth VTR 5, by way of the output selector 64. The controller 63 controls the operation of the video disc player 6, which includes operations of the output selector 64, the power supply circuit 65 and the reproducing circuit 61. The power supply circuit 65 supplies power to the video disc player 6.

The satellite broadcasting tuner 7 includes a satellite broadcasting tuner circuit 71, a controller 72, an output selector 73, and a power supply circuit 74 which are coupled as shown in FIG. 2. A signal is received through a satellite receiving antenna by use of the satellite tuner circuit 71 and reproduced therein. The reproduced signal is output from the satellite broadcasting tuner 7 through the output selector 73. The controller 72 controls the operation of the satellite broadcasting tuner 7, which includes operations of the output selector 73, the power supply circuit 74 and the satellite tuner circuit 71. Power is supplied to the satellite broadcasting tuner 7 from the power supply circuit 74. In the present AV system, one AV device may be designated as an AV center and one or more AV devices may be coupled thereto and, as such, designated as a child (slave) AV device or devices. Furthermore, in such AV system, one or more other AV devices may be coupled to the AV center by way of a child (slave) device(s) and, as such, designated as a grandchild AV device or devices.

For example, in the AV system of FIG. 2, the TV receiver 1 may be designated the AV center; and the fourth VTR 5, the first VTR 2, and the second VTR 3 are connected to the TV receiver 1 or AV center and accordingly are designated child AV devices. That is, the selectors 24, 34 and 54 of the first, second and fourth VTRs 2, 3 and 5 are coupled to the selector 16 of the TV receiver 1 and, as such, enable signals to be transmitted and/or received therebetween. Further, in such system, the video disc player 6 is connected to the fourth VTR 5 (which is designated a child AV device) and accordingly is designated a grandchild AV device, and the satellite tuner 7 and the third VTR 4 are connected to the first VTR 2 (which is designated a child AV device) and accordingly are designated as grandchild AV devices. That is, the selectors 44 and 73 of the third VTR 4 and the satellite tuner 7 are coupled to the selector 24 of the first VTR 2, and the selector 64 of the video disc player 6 is coupled to the selector 54 of the fourth VTR 5. Such connections between selectors permit signals to be transmitted and/or received therebetween.

Furthermore, as shown in FIG. 2, the controller 14 of the TV receiver 1 (the AV center) is bidirectionally connected to the controllers 23, 33, 43, 53, 63, and 72 of the AV devices 2–7 through a control bus 9. Such controller 14 is adapted to recognize the AV devices connected thereto and their corresponding operations. For example, each of the AV devices may supply an information signal to the controller 14 of the AV center by way of the control bus 9. Such information signal may represent an address which indicates the respective AV device and one or more functions or operations which may be performed by the respective AV device. The following table indicates an example of addresses and associated functions for the AV devices of the AV system of FIG. 2:

| Address | Device name | Bilingual program reception | Satellite broadcasting reception |
|---|---|---|---|
| ADR-01 | TV receiver | YES | NO |
| ADR-11 | Fourth VTR | NO | NO |
| ADR-12 | First VTR | YES | NO |
| ADR-13 | Second VTR | YES | YES |
| ADR-21 | VDP | YES | NO |
| ADR-22 | Satellite broadcasting tuner | YES | YES |
| ADR-23 | Third VTR | YES | NO |

In the example illustrated in the above table, all of the AV devices in the AV system of FIG. 2 except for the fourth VTR 5 may perform a bilingual programming function. Further, the second VTR 3 and the satellite broadcast tuner 7 may be adapted to receive a satellite broadcast signal.

When a dubbing operation, editing operation or the like is to be performed, the AV center transmits an input and output switching command signal which indicates a selected source AV device and a selected destination AV device. That is, the controller of the AV center (e.g., the controller 14) may transmit a signal by way of the control bus 9 to all of the AV devices. Such signal may include the respective addresses of the selected source AV device and the selected destination AV device. The controllers of the AV devices may be adapted so as to receive the switching command signal and if an address represented thereby matches the address of the respective AV device, then the controller of such AV device may activate or initiate the instructed command. As a result, the appropriate ones of the selectors of the TV receiver 1, the first VTR 2, the second VTR 3, the third VTR 4, the fourth VTR 5, the video disc player 6 and the satellite tuner 7 (i.e., selectors 16, 24, 34, 44, 54, 64, and 73) are switched or activated in response to the input and output switching command. In other words, the selected source AV device and the selected destination AV device are coupled therebetween by way of a signal path created between the selector of the source AV device and that of the destination AV device. As a result, a signal may be transmitted from the source AV device to the designation AV device through the signal path.

The controllers of the AV center and the AV devices may each include a processing-type device and a memory.

The present AV system may include a so-called "auto-all-off" function. Such function terminates the power of the AV center device and all of the other AV devices in the AV system at a predetermined time after an image signal has stopped being transmitted between AV devices such that the image signal is absent from or not present on a signal path formed between such AV devices. Further, the present AV system may include a so-called "dubbing-end-all-off" function. Such function terminates the power of the AV center device and all of the other AV devices of the AV system wherein a dubbing operation is intended to be performed when a recording medium of either the AV device performing the recording operation or the AV device performing the reproducing operation has advanced to its end position or when an image signal from the reproducing AV device is no longer being transmitted. Furthermore, the present AV system may include a so-called "timer-all-off" function which terminates the power of all of the AV devices of the AV system when or after a predetermined time has elapsed. A timer device may be utilized to set such predetermined time.

Each of the above-mentioned functions (that is, the auto-all-off function, the dubbing-end-all-off function and the timer-all-off function) will be more fully described hereinbelow.

The auto-all-off function will now be described with reference to FIGS. 3–5.

Figure 3:
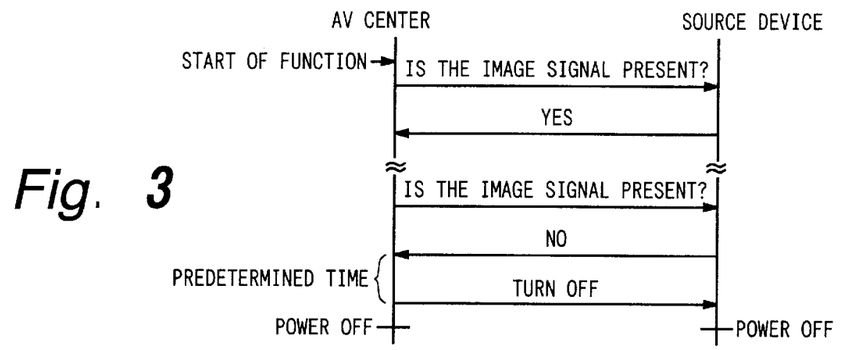
FIG. 3 is a diagram to which reference will be made in explaining a first embodiment of the present invention.

FIG. 3 illustrates a situation in which the AV center (in this case, the TV receiver 1) is able to execute the auto-all-off function. In such situation, the AV center recognizes the currently selected source device. For example, the controller of the selected source device may send a signal to the controller of the AV center by way of the control bus 9 which may represent the address of the selected source device and inform the controller of the AV center of such selection. Alternatively, the controller of the AV center may have caused the respective device to be initially activated as a source device by use of a switching command signal in a manner similar to that previously described and, as such, the AV center knows that such device is the source device. The source device may be selected from the VTRs 2 to 5, the video disc player 6, and the satellite broadcasting tuner 7. As shown in FIG. 3, when the AV center executes the auto-all-off function, it asks the source device if an image signal is present. As an example, the controller of the AV center may ask the controller of the source device if a signal, such as a video signal, is currently being transmitted to another AV device. If an image signal is present (or currently being transmitted), the controller of the source device may transmit an affirmative reply to the controller of the AV center by way of the control bus 9. Such asking by the AV center may continue at predetermined time intervals. When an image signal is absent or not present, the controller of the source device may transmit a negative reply (which represents that an image signal is absent) to the controller of the AV center by way of the control bus 9. Within a predetermined time interval (which may be from several minutes to ten minutes or longer) after receiving such negative reply, the AV center executes a so-called all-power-off function in which the controller of the AV center may generate and transmit a power-off command signal to the controllers of all of the AV devices. As a result, the controller of each AV device supplies a signal to the respective power supply circuit so as to cause the power of all the AV devices to be turned off. Thereafter, the power of the AV center is turned off.

Figure 4:
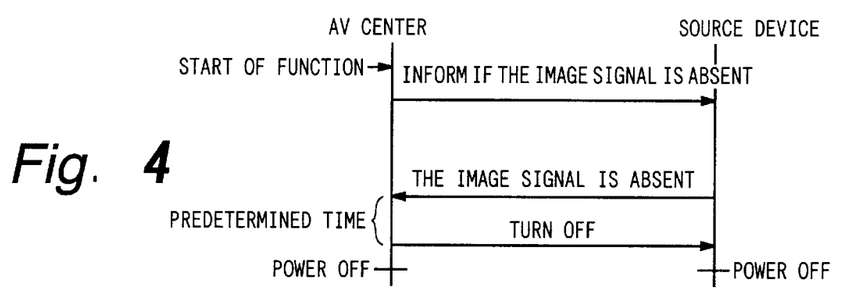
FIG. 4 is a diagram to which reference will be made in explaining a modification of the first embodiment of the present invention.

FIG. 4 illustrates a variation of the procedure described above with reference to FIG. 3. More specifically, instead of the AV center continuously asking the source device if an image signal is present at predetermined time intervals as in FIG. 3, the AV center transmits a command signal to the source device which instructs the source device to inform the AV center if an image signal is absent or not being transmitted as shown in FIG. 4. Accordingly, when an image signal is absent (or not being transmitted), the source device transmits an informational signal to the AV center which represents that an image signal is absent. Within a predetermined time interval (which may from several minutes to ten minutes or longer) after receiving such informational signal, the AV center executes the all-power-off function. As a result, the AV center transmits a power-off command signal to all of the AV devices, the power of all the AV devices are turned off and, thereafter the power of the AV center is turned off.

Figure 5:
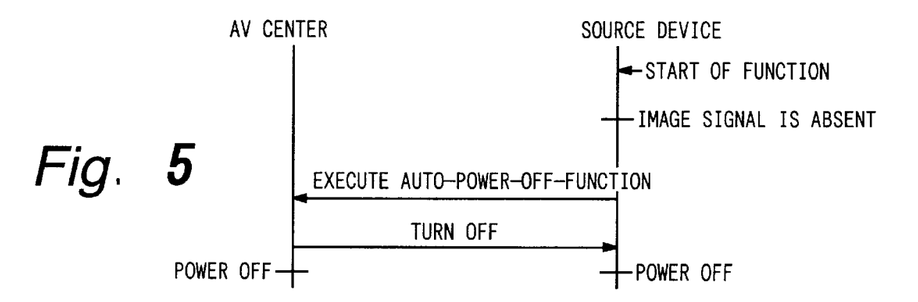
FIG. 5 is a diagram to which reference will be made in explaining another modification of the first embodiment of the present invention.

Another variation of the above-described auto-all-off function is illustrated in FIG. 5. In the variation of FIG. 5, the source device (not the AV center device as in the situations of FIGS. 3 and 4) is able to execute the all-off function. In this situation, the source device is adapted to determine that a signal (such as a video or image signal) is absent or not being transmitted therefrom. The manner in which such determination is obtained may be dependent on the type of AV device which is the source device. For example, if the source device is a satellite broadcasting tuner or a TV built-in tuner, an image or video signal is absent when all broadcasting programs of each day are completed. As another example, if the source device is a VTR, an image signal is absent when a non-recorded portion of a tape lasts for a predetermined time (such as several minutes). Within a predetermined time interval (such as several minutes to ten minutes or longer) of determining that a signal is not being transmitted, the source device transmits a command signal to the AV center instructing the AV center to execute the auto-power-off function, whereupon the AV center executes such function. As a result, the AV center transmits a power-off command signal to all of the AV devices, whereupon the power of all the AV devices are turned off and, thereafter the power of the AV center is turned off.

The dubbing-end-all-off function will now be described with reference to FIGS. 6–8. As previously described, such function terminates the power of the AV center device and all of the other AV devices of the AV system wherein a dubbing operation is performed when a recording medium of either the AV device performing the recording operation or the AV device performing the reproducing operation has advanced to its end position or when an image signal from the reproducing AV device is no longer being transmitted.

Figure 6:
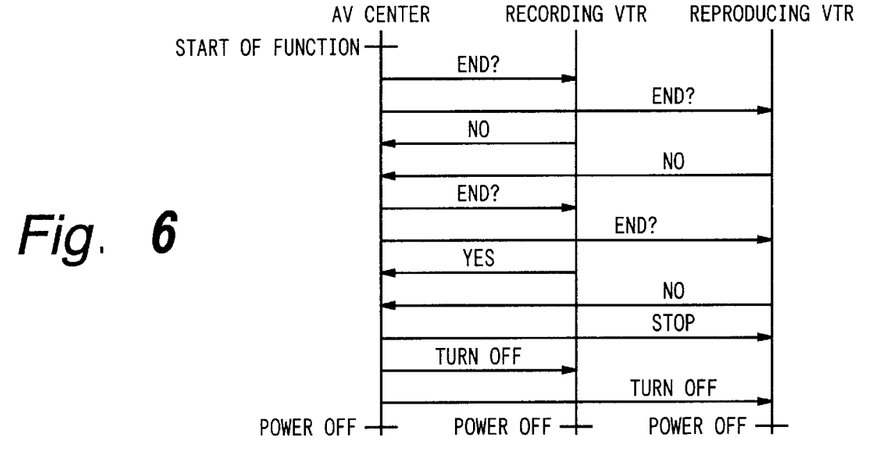
FIG. 6 is a diagram to which reference will be made in explaining a second embodiment of the present invention.

FIG. 6 illustrates a situation in which the AV center is able to execute the dubbing-end-all-off function. In this situation, the AV center continuously transmits a command signal at predetermined time intervals to both the recording VTR and the reproducing VTR which asks each of such VTRs if its respective medium is at its end position. If a medium is not at its respective end position, the respective VTR transmits a negative reply to the AV center. If, however, a medium is at its end position, the respective VTR transmits an affirmative reply to the AV center, thereby informing the AV center that its medium has reached its end position. When the AV center receives an affirmative reply from one of the recording VTR and the reproducing VTR, the AV center transmits a stop signal to the VTR whose medium has not reached its end position so as to cause such VTR to stop. Thereafter, the AV center executes the all-power-off function which includes transmitting a power-off command signal to all of the AV devices. As a result, the controller of each AV device supplies a signal to the respective power supply circuit so as to cause the power for all of the AV devices to be turned off. Thereafter, the power of the AV center is terminated.

Further, the dubbing-end-all-off function may cause power to be terminated to the AV center and all of the AV devices when an image signal from the reproducing AV device is no longer being transmitted. Such termination may be performed in a manner similar to that previously described with regard to the auto-all-off function.

The command and stop signals may be generated by the controller of the AV center and transmitted therefrom to the controllers of the recording and reproducing VTRs by way of the control bus 9. The affirmative and negative replies may be generated by the controllers of the recording and reproducing VTRs and transmitted therefrom to the controller of the AV center by way of the bus 9. Similarly, in the below described variations of the dubbing-end-all-off function, signals transmitted by the AV and the VTRs may be generated by the respective controllers thereof and transmitted therefrom by way of the control bus 9.

Figure 7:
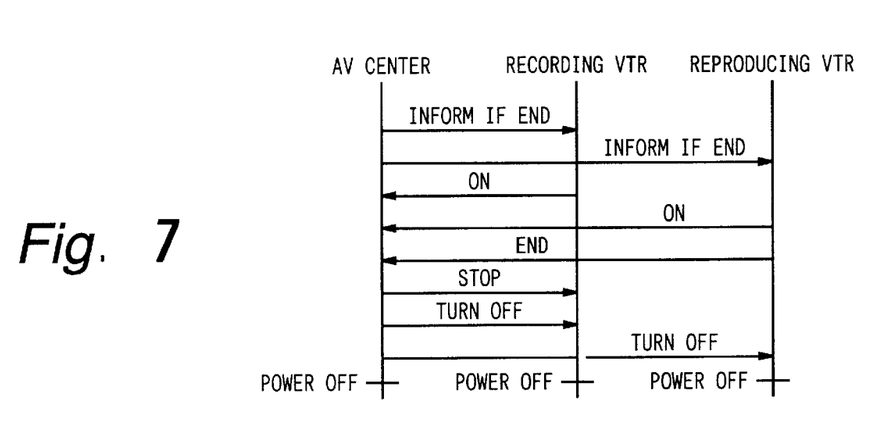
FIG. 7 is a diagram to which reference will be made in explaining a modification of the second embodiment of the present invention.

FIG. 7 illustrates a variation of the function described above with reference to FIG. 6. More specifically, instead of the AV center continuously asking the recording and reproducing VTRs if a medium has reached its end position as previously described, the AV center transmits a command signal instructing such VTRs to inform the AV center when a medium has reached its end position as shown in FIG. 7. When the medium of one of the recording VTR and the reproducing VTR has reached its end position, the respective VTR transmits an end signal to the AV center informing the AV center of this occurrence. As a result, the AV center stops the VTR whose medium has not reached its end position and executes the all-power-off function in a manner similar to that described with reference to FIG. 6. After the recording VTR and the reproducing VTR receive the command signal from the AV center and prior to one of these VTRs sending an end signal to the AV center, the VTRs may transmit an "ON" signal indicating that an operation is still being performed by the VTR.

Figure 8:
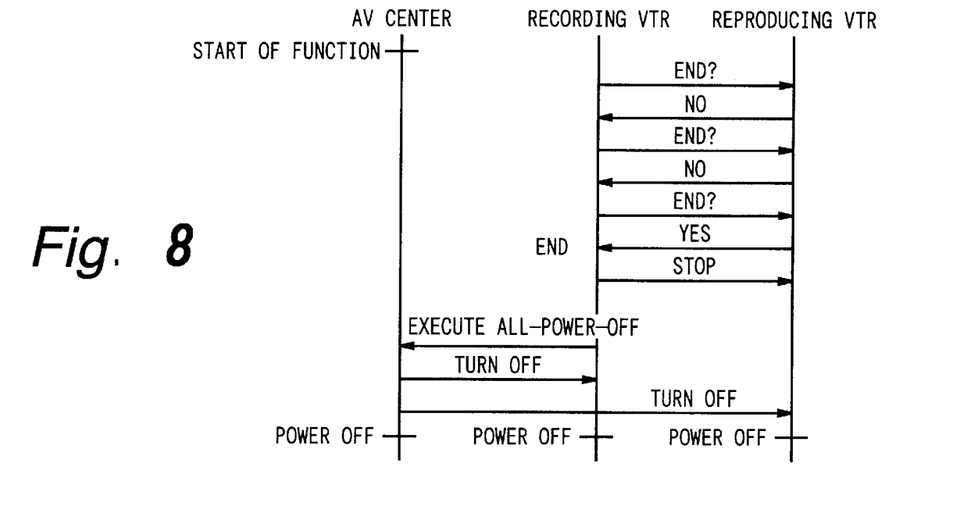
FIG. 8 is a diagram to which reference will be made in explaining another modification of the second embodiment of the present invention.

FIG. 8 illustrates another variation of the above-described dubbing-end-all-off function in which the recording VTR (not the AV center device as in FIGS. 6 and 7) is able to execute the dubbing-end-all-off function. More specifically, the recording VTR continuously transmits, at predetermined time intervals, a command signal to the reproducing VTR asking if the medium of the reproducing VTR has reached its end position. In response to this question, the reproducing VTR transmits a negative reply to the recording VTR if the medium of the reproducing VTR has not reached its end position. If, however, the medium of the reproducing VTR has reached its end position, the reproducing VTR transmits a signal to the recording VTR informing the recording VTR of this occurrence. When the recording VTR has received the signal indicating that the medium of the reproducing VTR has reached its end position, the recording VTR transmits a signal to the reproducing VTR so as to cause the same to stop and transmits a command signal to the AV center instructing the AV center to execute the all-power-off function. When the AV center receives such command signal, the AV center executes the all-power-off function which includes transmitting a power-off command signal to all of the AV devices. As a result, the power of all of the AV devices are terminated and then the power of the AV center is turned off.

As an alternative, instead of the recording VTR transmitting a signal to the reproducing VTR asking if its medium is at its end position at predetermined time intervals, the recording VTR may send a command signal to the reproducing VTR instructing the reproducing VTR to inform the recording VTR when the medium of the reproducing VTR is at its end position. When such medium is at its end position, the reproducing VTR sends an informational signal indicating that the medium is at its end position to the recording VTR. When the recording VTR receives such informational signal, it causes the reproducing VTR to stop and the causes the AV center to execute the all-power-off function in a manner similar to that previously described.

Although in describing the present dubbing-end-all-off function, situations were described in which the AV center and the recording VTR are able to initiate or execute the dubbing-end-all-off function, the present invention is not so limited and other variations thereof may be utilized. For example, the reproducing VTR may have such dubbing-end-all-off function. Alternatively, the reproducing VTR and the recording VTR may be provided with the all-power-off function.

The timer-all-off function will now be described.

Figure 9:
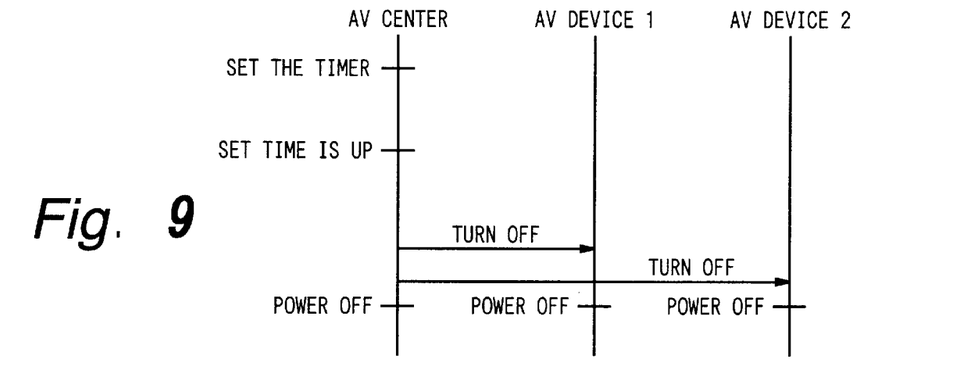
FIG. 9 is a diagram to which reference will be made in explaining a third embodiment of the present invention.
Figure 10:
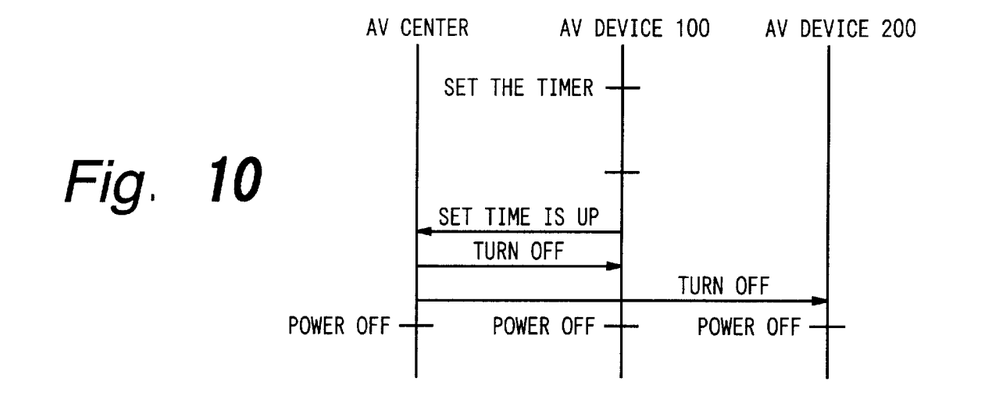
FIG. 10 is a diagram to which reference will be made in explaining a modification of the third embodiment of the present invention.

FIG. 9 illustrates an example of the timer-all-off function. In such example, the AV center is able to execute the timer-all-off function by utilizing a timer. More specifically, the AV center includes a timer device which, for example, may be included within the controller thereof. A desired clock time or count-down time may be set within such timer device. Upon reaching the time set in the timer, the AV center transmits a power-off command signal to each of the AV devices. As a result, the controllers of each AV device supplies a signal to the respective power supply circuit so as to cause the power for the AV devices to be terminated. Thereafter, the power for the AV center is turned off. Further, upon reaching the set time of the timer and prior to transmitting the power-off command signal, the AV center may determine whether or not there are devices which are currently recording and/or reproducing data in the AV system. In such a situation, the AV center may refrain from transmitting a power-off command signal to the operating AV devices so to protect the signal path therebetween and not interrupt the operations being performed. FIG. 10 illustrates a variation of the timer-all-off function described with reference to FIG. 9. That is, unlike the arrangement of FIG. 9 wherein the AV center is able to execute the timer-all-off function, in the arrangement of FIG. 10, an AV device 100 is able to execute such function. More specifically, in the arrangement of FIG. 10, a timer device is included within the AV device 100 and a desired time (or count down time) is set in such timer device. When the set time has elapsed, the AV device 100 transmits a signal representing that the set time has elapsed or an auto-all-off-feature command signal to the AV center. Upon receiving such signal, the AV center sends a power-off command signal to each AV device, that is, AV devices 100 and 200. As a result, the power for the AV devices is terminated and thereafter the power for the AV center is turned off in a manner similar to that previously described.

In the above-described timer-all-off function, unless specifically otherwise stated, the command signals may be generated and/or received by the controller of the respective AV center or AV device.

Therefore, the present invention provides the auto-all-off function wherein the power of the AV center and the AV devices are turned off at a predetermined time after an video or image signal is absent on a signal path; the dubbing-end-all-off function wherein the power of the AV center and the AV devices may be turned off when a recording medium of one of a recording AV device and a reproducing AV device that are performing a dubbing operation is at an end position or when an image signal from the reproducing AV device is no longer being transmitted; and the timer-all-off function wherein the power for the AV center and all the AV devices can be turned off at a set time. Thus, by utilizing the present invention, the power of the AV devices included within an AV system may be automatically turned off upon the occurrence of a particular event. As a result, the overall operability of the AV system is improved.

Further, although the present invention was described with reference to the AV system illustrated in FIGS. 1 and 2, the present invention is not so limited. That is, the present invention may be applied to an AV system having a different number and/or arrangement of AV devices as compared to that of FIGS. 1 and 2.

Furthermore, instead of turning off the power to all of the AV devices in an AV system, the above-described functions of the present invention may be adapted to cause power of only a specified one or ones of the AV devices to be turned off upon or after the occurrence of a predetermined event.

Additionally, an AV system according to the present invention may include any one or any combination of the above-described functions. For example, an AV system may be configured so as to have the present auto-all-off function, the dubbing-end-all-off function and the timer-all-off function. Alternatively, an AV system may be configured so as to have only one of the present auto-all-off function, the dubbing-end-all-off function and the timer-all-off function.

Further, in a manner similar to that described above with regard to the timer-all-off function, the present invention may be adapted to determine whether or not there are any devices in the AV system which are currently performing a desired operation prior to terminating the power of such devices even if an event has occurred which would otherwise cause the power for all of the devices to be turned off. Such determination may be performed by the controller of either or both the AV center and the respective device(s). As an example, consider the situation in which two dubbing operations are being performed in an AV system, that is, one such operation is being performed using first and second VTRs A and B and the other operation is being performed using third and fourth VTRs C and D. In such situation, if the medium of one of the VTRs A and B reaches its end position, the above dubbing-end-all-off function may cause power to be terminated to all of the devices in the AV system including the VTRs A–D even though the VTRs C and D may still be performing its dubbing operation. To avoid this interruption of the operation of VTRs C and D, the present invention performs the above-described determination prior to terminating the power of the devices. In this situation, such determination would reveal that VTRs C and D are still currently performing an operation. Accordingly, power for the VTRs C and D would not be terminated, but power to the other devices in the AV system would be terminated.

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. A method for controlling an audio video system having at least three audio video devices which include a television receiver and a plurality of recording and/or reproducing units, each of said audio video devices having a controller coupled to each respective controller of at least another one of said audio video devices, in which at least one of said audio video devices transmits audio and video signals to at least one of the other audio video devices, said method comprising the steps of:

designating one of said audio video devices as a control audio video device;

sending information to the designated control audio video device from each of the other audio video devices which respectively identifies the other audio video devices and indicates a function or functions performable by the other audio video devices;

detecting whether a video signal is present on a signal path between said audio video devices; and supplying a control signal from said control audio video device to each of the other audio video devices of said audio and video system so as to cause power to be turned off in the other audio video devices and causing power to be turned off in said control audio video device when said video signal is absent from said signal path.

2. A method for controlling an audio video system according to claim 1, wherein the controller of said control audio video device transmits said control signal to the controllers of the other audio video devices when said video signal is absent from said signal path.

3. A method for controlling an audio video system according to claim 1, wherein each audio video device transmitting said audio and video signals to the respective at least one other audio video device detects whether said video signal is present on said signal path between the transmitting audio video device and the respective at least one other audio video device.

4. A method for controlling an audio video system having at least three audio video devices which include a television receiver, a reproducing audio video device and a recording audio video device, each of said audio video devices having a controller coupled to each respective controller of at least another one of said audio video devices, in which data is dubbed from said reproducing audio video device to said recording audio video device, said method comprising the steps of:

designating one of said audio video devices as a control audio video device;

sending information to the designated control audio video device from each of the other audio video devices which respectively identifies the other audio video devices and indicates a function or functions performable by the other audio video devices;

determining whether or not a recording medium of one of said reproducing audio video device and said recording audio video device is at an end position; and supplying a control signal from said control audio video device to each of the other audio video devices in said audio video system so as to cause power to be turned off in the other audio video devices and causing power to be turned off in said control audio video device when the recording medium of one of said reproducing audio video device and said recording audio video device is at the respective end position.

5. A method for controlling an audio video system according to claim 4, wherein the controller of said control audio video device transmits said control signal to the controllers of the other audio video devices when the recording medium of one of said reproducing audio video device and said recording audio video device is at the respective end position.

6. A method for controlling an audio video system according to claim 5, wherein said controller of said control audio video device transmits a stop command signal to the controller of the one of said reproducing audio video device and said recording audio video device having the recording medium which is not at the respective end position prior to transmitting said control signal.

7. A method for controlling an audio video system having at least three audio video devices which include a television receiver and a plurality of recording and/or reproducing units, each of said audio video devices having a controller coupled to each respective controller of at least another one of said audio video devices, said method comprising the steps of:

designating one of said audio video devices as a control audio video device;

sending information to the designated control audio video device from each of the other audio video devices which respectively identifies the other audio video devices and indicates a function or functions performable by the other audio video devices;

determining whether or not a predetermined set time has elapsed;

determining whether any of said audio video devices is operating in a respective predetermined manner;

supplying a control signal from said control audio video device to each of the other audio video devices of said audio video system so as to cause power to be turned off in the other audio video devices which are determined not to be operating in the respective predetermined manner and causing power to be turned off in said control audio video device if said control audio video device is determined not to be operating in the respective predetermined manner when said predetermined set time has elapsed.

8. In an audio video system having a at least three audio video devices which include a television receiver and a plurality of recording and/or reproducing units, each having a controller coupled to the controller of at least another one of said audio video devices, at least one of said audio video devices transmits audio and video signals to at least one of the other audio video devices, an apparatus for controlling said audio video system comprising:

means for designating one of said audio video devices as a control audio video device;

means for sending information to the designated control audio video device from each of the other audio video devices which respectively identifies the other audio video devices and indicates a function or functions performable by the other audio video devices;

means for detecting whether a video signal is present on a signal path between said audio video devices; and means for supplying a control signal from said control audio video device to each of the other audio video devices of said audio video system so as to cause power to be turned off in the other audio video devices and for causing power to be turned off in said control audio video device when said video signal is absent from said signal path.

9. An apparatus for controlling an audio video system having at least three audio video devices which include a television receiver and a plurality of recording and/or reproducing units, said apparatus comprising:

means for supplying power to said audio video devices;

means for designating one of said audio video devices as a control audio video device;

means for sending information to the designated control audio video device from each of the other audio video devices which respectively identifies the other audio video devices and indicates a function or functions performable by the other audio video devices;

means for determining whether or not a predetermined set time has elapsed;

means for determining whether any of said audio video devices is operating in a respective predetermined manner; and means for supplying a control signal from said control audio video device to each of the other audio video devices of said audio video system so as to cause power to be turned off in the other audio video devices which are determined not to be operating in the respective predetermined manner and for causing power to be turned off in said control audio video device if said control audio video device is determined not to be operating in the respective predetermined manner when said predetermined set time has elapsed.

10. An apparatus for automatically terminating power to one or more audio video devices of an audio video system having at least three audio video devices including a television receiver, a reproducing audio video device and a recording audio video device, said apparatus comprising:

means for supplying power to said audio video devices;

means for designating one of said audio video devices as a control audio video device;

means for sending information to the designated control audio video device from each of the other audio video devices which respectively identifies the other audio video devices and indicates a function or functions performable by the other audio video devices;

means for determining whether a video signal is being transmitted between two of said audio video devices;

means, responsive to a determination that said video signal is not being transmitted between the two audio video devices, for terminating power to at least the two audio video devices;

means for determining whether or not a recording medium of one of said reproducing audio video device and said recording audio video device is at an end position;

means, responsive to a determination that the recording medium of one of said reproducing audio video device and said recording audio video device is at the respective end position, for terminating power to at least one of the recording audio video device and the reproducing audio video device;

means for determining whether or not a predetermined set time has elapsed;

means for determining whether any of said audio video devices is operating in a respective predetermined manner; and means for supplying a control signal from said control audio video device to each of the other audio video devices of said audio video system so as to cause power to be turned off in the other audio video devices which are determined not to be operating in the respective predetermined manner and for causing power to be turned off in said control audio video device if said control audio video device is determined not to be operating in the respective predetermined manner when said predetermined set time has elapsed.

* * * * *